(12) United States Patent
Frusina

(10) Patent No.: US 10,362,483 B2
(45) Date of Patent: Jul. 23, 2019

(54) SYSTEM, METHODS AND DEVICES FOR SECURE DATA STORAGE WITH WIRELESS AUTHENTICATION

(71) Applicant: GREEN TREE LABS INC., Kitchener (CA)

(72) Inventor: Cristian Frusina, Toronto (CA)

(73) Assignee: Cristian Frusina, Kitchener (CA)

( * ) Notice: Subject to any disclaimer, the term of this patent is extended or adjusted under 35 U.S.C. 154(b) by 251 days.

(21) Appl. No.: 15/475,343

(22) Filed: Mar. 31, 2017

(65) Prior Publication Data

US 2017/0289800 A1 Oct. 5, 2017

Related U.S. Application Data

(60) Provisional application No. 62/316,646, filed on Apr. 1, 2016.

(51) Int. Cl.
| | |
|---|---|
| *H04L 29/06* | (2006.01) |
| *H04W 12/06* | (2009.01) |
| *H04W 12/04* | (2009.01) |
| *H04W 12/08* | (2009.01) |
| *G06F 21/60* | (2013.01) |
| *H04L 29/08* | (2006.01) |
| *G06F 3/06* | (2006.01) |
| *H04W 12/00* | (2009.01) |

(52) U.S. Cl.
CPC ............ *H04W 12/06* (2013.01); *G06F 3/061* (2013.01); *G06F 3/0622* (2013.01); *G06F 3/0634* (2013.01); *G06F 3/0673* (2013.01); *G06F 21/602* (2013.01); *H04L 63/0442* (2013.01); *H04L 63/0876* (2013.01); *H04L 67/10* (2013.01); *H04L 67/1097* (2013.01); *H04L 69/16* (2013.01); *H04W 12/04* (2013.01); *H04W 12/08* (2013.01); *G06F 2221/2107* (2013.01); *H04W 12/00503* (2019.01); *H04W 12/00512* (2019.01)

(58) Field of Classification Search
CPC ..... H04W 12/06; H04W 12/04; H04W 12/08; G06F 3/061; G06F 3/0622; G06F 3/0634; G06F 3/0673; G06F 21/602; G06F 12/1408; G06F 21/78; G06F 2221/2107; H04L 63/0442; H04L 63/0876; H04L 67/10; H04L 67/1097; H04L 69/16
See application file for complete search history.

(56) References Cited

U.S. PATENT DOCUMENTS

| | | | | |
|---|---|---|---|---|
| 5,825,878 | A * | 10/1998 | Takahashi | G06F 21/79 713/190 |
| 9,626,376 | B1 * | 4/2017 | Chew | G06F 16/178 |
| 2007/0178936 | A1 * | 8/2007 | Chiang | G06F 1/1613 455/557 |
| 2008/0069358 | A1 * | 3/2008 | Yang | G06F 21/78 380/247 |
| 2008/0129577 | A1 * | 6/2008 | Pan | G08C 17/02 341/175 |

(Continued)

*Primary Examiner* — Yogesh Paliwal
(74) *Attorney, Agent, or Firm* — Anil Bhole; Marc Campert; Bhole IP Law

(57) ABSTRACT

A secure data storage device with wireless authentication is provided. The described data storage device is wirelessly unlocked using another wireless device. The secure data storage device interoperates with a cloud server for configuring and managing the data storage device.

18 Claims, 9 Drawing Sheets

(56) References Cited

U.S. PATENT DOCUMENTS

| | | | | |
|---|---|---|---|---|
| 2008/0162942 A1* | 7/2008 | Marshall | ............ | G07C 9/00309 |
| | | | | 713/185 |
| 2009/0260078 A1* | 10/2009 | Nakazawa | .............. | G06F 21/31 |
| | | | | 726/19 |
| 2013/0326591 A1* | 12/2013 | Jang | ...................... | H04W 12/08 |
| | | | | 726/4 |

* cited by examiner

SYSTEM, METHODS AND DEVICES FOR SECURE DATA STORAGE WITH WIRELESS AUTHENTICATION

TECHNICAL FIELD

The present disclosure relates generally to secure data storage devices. More specifically, this disclosure relates to embodiments of secure data storage devices with wireless authentication.

BACKGROUND

There is growing demand for portable storage devices and solutions. There is interest in increased storage capacity, but also for improved file security.

Examples of portable storage devices include hard drives, thumb drives and other devices with access to cloud storage. The most common form of protection for storage media is password authentication. Cloud storage using password protection requires users to log into a specific website or install proprietary software on the host which authenticates with the cloud server. Thumb drives typically use proprietary software which must be installed on the host system. In each case, the proprietary software is additional software required to be installed on the host device for the purpose of authentication at the particular secure data storage device.

Proprietary software on the host system may be compromised by malicious users through OS or browser exploits, viruses, trojans, key loggers, and many other forms of intrusions known to those specializing in security. Cloud storage and the current secure thumb drives are also vulnerable to a wide range of attacks.

SUMMARY

In one aspect, a wireless secure data storage device is provided, the device comprising: a data store connected to one or more interfaces for transferring data from the data store; a processing unit; an electronic switch coupled to the data store and the processing unit; and, one or more wireless communication components coupled to the processing unit for communicating with a host device for obtaining authentication data; wherein the electronic switch and the processing unit cooperate to switch the device between a closed state, where data cannot be accessed from the data store through the one or more interfaces, to an open state, where data can be accessed from the data store through the one or more interfaces, upon the processing unit matching obtained authentication data to a stored secret key.

In another aspect, a method is provided of authenticating a user to a wireless secure data storage device comprising a data store connected to one or more interfaces, a processing unit, an electronic switch coupled to the data store and the processing unit, and one or more wireless communication components coupled to the processing unit, the method comprising: obtaining, by the processing unit, authentication data from a host device; matching, by the processing unit, the authentication data to a stored secret key; and, switching, by the processing unit and the electronic switch, the device from a closed state, where data cannot be accessed from the data store through the one or more interfaces, to an open state, where data can be accessed from the data store through the one or more interfaces.

These and other aspects are contemplated and described herein. It will be appreciated that the foregoing summary sets out representative aspects of systems, methods and devices for secure data storage to assist skilled readers in understanding the following detailed description.

BRIEF DESCRIPTION OF THE DRAWINGS

The features of the invention will become more apparent in the following detailed description in which reference is made to the appended drawings wherein.

DETAILED DESCRIPTION

Figure 1A:
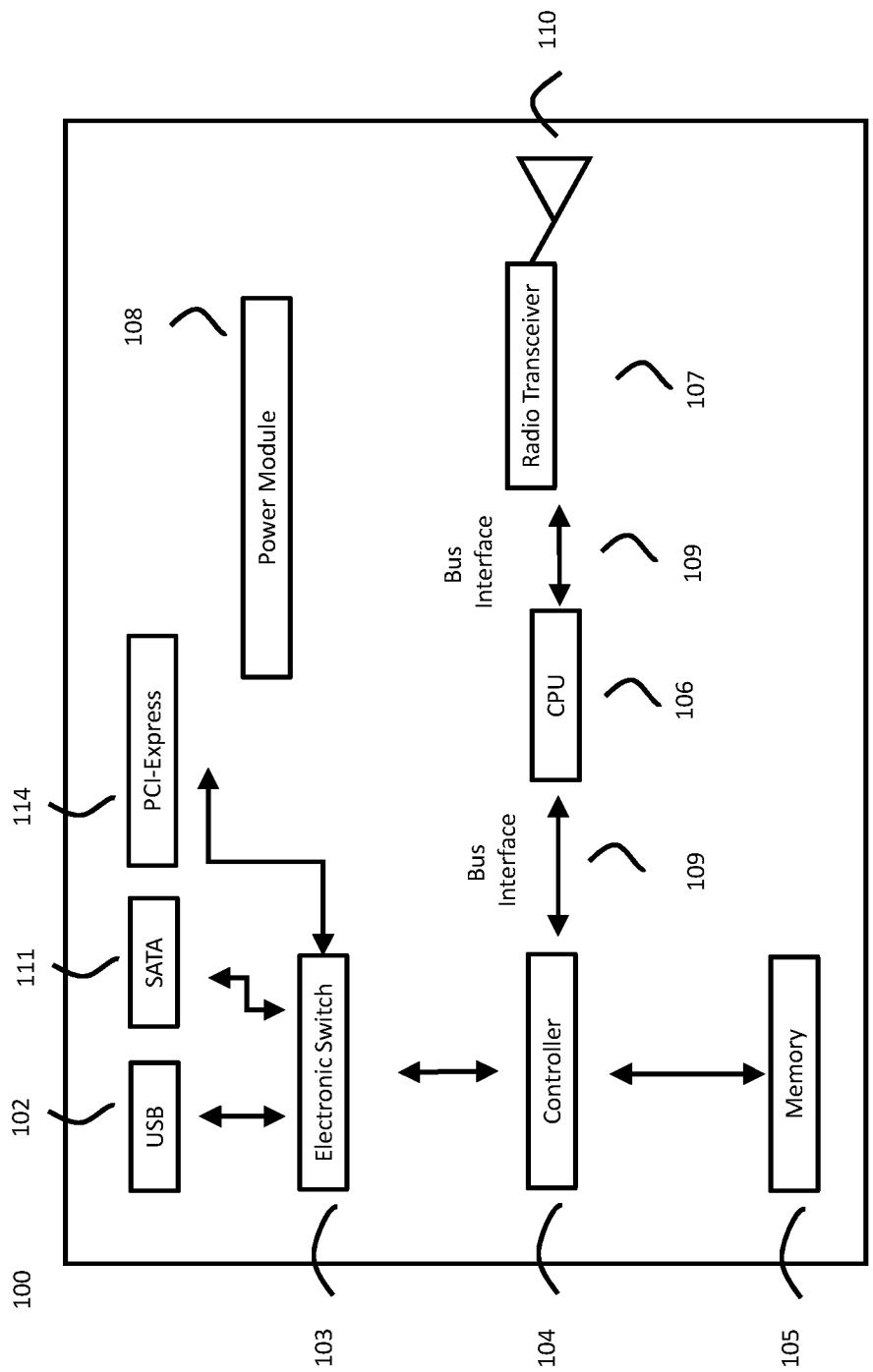
FIG. 1A is a block diagram of an embodiment of a wireless secure data storage drive ("WSDSD") of the present invention.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

In one aspect, in the following, embodiments of a wireless secure data storage drive ("WSDSD") are provided wherein the device can be unlocked via a wireless connection with a host device. More particularly, in embodiments the WSDSD comprises one or more data stores connected to one or more data transfer interfaces, an electronic switch, a wireless communication component and a processing unit (which comprises a data store controller and a CPU). The electronic switch couples the one or more data stores and the processing unit. The processing unit is configured to trigger the electronic switch to unlock the one or more data stores for communication of stored data to a user via the one or more interfaces (wired or wirelessly) upon the device wirelessly receiving correct authentication information from the host device via the wireless communication component. In various embodiments, at least the electronic switch, processing unit and one or more data stores are combined on a single integrated circuit ("IC") chip to minimize the risk of tampering.

In another aspect of the invention, a data storage device is provided with enhanced security features based on integrated wireless features, examples of which are described below.

In another aspect of the present invention, the data storage device includes integrated encryption features.

In another aspect of the invention, the data storage device also includes a novel security feature using wireless signal strength as a proximity sensor, as further explained below.

In the paragraphs that follow, various embodiments of the WSDSD and associated systems will be described, before being described with reference to the drawings.

Particular embodiments of the WSDSD for wireless authentication of a user will now be described.

In one aspect of the invention, a data storage device is provided that is configured for wireless authentication. The data storage device may be disposed as a flash drive (i.e. with flash storage and a USB interface).

Secure data storage devices typically require authentication in order to access stored data. Authentication, as previously stated involves user authentication. In the case of authentication of a small data storage devices (such as flash drive), which may not on its own enable user authentication, software and/or devices often need to be installed on a computer associated with the data storage device, such as a desktop computer or laptop computer. This generally then requires that such software interoperate with the operating system resident on such desktop computer or laptop computer, which in turn renders the solution subject to the vulnerabilities inherent to such operating system.

There is a need to mitigate such vulnerabilities, and further it is useful to be able to use a mobile device such as a smart phone or tablet computer (which most users have on hand) as the means for providing authentication of the user to the data storage device.

In one aspect of the invention, a plurality of embodiments are provided for a wireless secure data storage device that incorporates functionality for wireless authentication of the data storage device, using a mobile device. The wireless secure data storage device includes components (described below) and proprietary software that enables the wireless secure data storage device to connect to a mobile device to authenticate a user associated with both the mobile device and the wireless secure data storage device. This mobile device, used to authenticate the wireless secure data storage device may also be referred to as the "host device".

As explained below, it is desirable and convenient that the host device consists of a mobile device, such as a smart phone or a tablet computer, however, in some implementations or use cases it may be desirable that a desktop computer or laptop computer act as a host device.

In one aspect of this embodiment, the host device does not require installation of the proprietary software, and thus vulnerabilities of the operating system associated with the host device may be avoided.

In addition, the host device may be used to access various technologies or methods for authenticating the user, such as fingerprint technologies, passwords, pattern recognition, face recognition, voice recognition and so on. These authentication technologies may be installed on the mobile device, part of the mobile device features or software, or may be implemented as peripherals that are connected to the mobile device that may utilize computing resources of the mobile device.

The wireless connection now described may be established using a Bluetooth or WiFi or WiGig connection for example.

The host device now described is designated for the purpose of authenticating the user. The host device and associated identifiers may be stored in the Cloud Server described later. In one aspect of the invention, the host device consists of a device associated with a user who is also authorized to access the wireless secure data storage device, but where the host device is separate and apart from the wireless secure data storage device itself. The host device may also be a USB device that is different from the USB device consisting of the wireless secure data storage device itself.

In one aspect of the invention the security feature requiring a wireless connection to a host device is implemented using a proprietary program or proprietary computer code. Therefore, use of operating system software, including a computer operating system (for use on a smart phone or on desktop or laptop computer) is not required for providing the security features of the present invention. More particularly, additional proprietary authentication software at the host device is still required if the WSDSD authenticates with a desktop, laptop or smart device. However, no additional software is required if the device unlocks by a GPS unit, a hardware key or another wireless device that is used to authenticate.

One advantage of the ability to authenticate the user by means of wireless authentication is to avoid the need for cables or physical connection to initiate the user authentication process.

In various embodiments, authentication thus occurs at the WSDSD based on authentication data wirelessly received from the host device. More particularly, the received authentication data may be matched to a secret key (e.g. an alphanumeric key) stored at the device with a variable length used to accomplish the authentication of the user. For example a text password, voice, pattern, fingerprint or face recognition can all be converted into an alphanumeric key. This secret key will be stored on the WSDSD. When the user tries to authenticate using the host device, the WSDSD compares the received authentication data to the secret key (which may comprise first converting the authentication data to an alphanumeric form, depending on whether the data is converted at the host device or WSDSD). If the secret key matches, the user is authentic and the WSDSD proceeds to unlock the data store(s). The device is most secure if the password the user uses is long and has a combination of symbols and alphanumeric characters. For example, if the user decides to have only a 4 character password with numbers between 0 to 9, the authentication becomes less secure as the possibilities of the user's password are small and can be cracked in a reasonable amount of time.

Alternatively or additionally to the secret key, there are other ways to further restrict the user and authenticate the user. For example, additional data to be matched could include smart device/host device wireless MAC, IMEI, serial number, and other unique identification factors based on the device used to communicate with the WSDSD.

If an encryption scheme is implemented, as described below in various embodiments, the authentication data, along with any other data sent to the WSDSD may be sent in encrypted form. In such embodiments, the host device (laptop, desktop, anything with a physical USB device, smart device (whether wireless or wired, e.g. using USB/Thunderbolt) sends encrypted messages to the WSDSD which the WSDSD decrypts according to a public/private key authentication protocol. In such cryptographic schemes, the private key resides on the WSDSD, while the host device/smart device will receive a public key from the WSDSD which will then be stored on the said device. All data sent to the WSDSD may thus be encrypted with the public key and decrypted on the WSDSD with the private key. In such embodiments, when the user tries to authenticate using the smart device/host device, the public key is used to encrypt the whole message, the message is sent to the WSDSD, the WSDSD uses the stored private key to decrypt the message and compares it to its stored secret key. If the secret key matches, the user is authentic and the WSDSD proceeds to unlock the data store(s).

The foregoing embodiments integrating wireless components in secure data storage devices will be discussed below more particularly with reference to the figures.

Embodiments of WSDSDs incorporating both WiFi or WiGig and Bluetooth wireless components will now be described.

In one aspect, embodiments of the wireless secure data storage device of the present invention, include both a WiFi or WiGig wireless component (including a WiFi or WiGig configured radio transceiver), and a Bluetooth wireless component (including a Bluetooth configured radio transceiver).

Conventional wireless secure data storage devices may include a WiFi or WiGig wireless component, for example for high speed data transfer but do not include a Bluetooth wireless component.

In one aspect of the invention, the wireless secure data storage device includes: (A) a WiFi or WiGig wireless component for high speed data transfer between devices and (B) a Bluetooth wireless component for interoperating with another device (such as the host device previously mentioned) to communicate for example battery status, file transfer status, encryption set up and so on.

Upon successful authentication, the host device will gain access to the data stored on the WSDSD (e.g. flash device). Using the WiFi or WiGig wireless communication for high speed data transfer, users may manipulate files on the flash device directly over another wireless enabled device such as a smartphone, laptop or smart devices such as TV, digital white board, projectors, etc. Users may also stream files for watching video or playing music without physically having to plug the flash drive in to the host device. The wireless flash drive may also join a typical wireless home/office network in which it may act as a backup drive or network storage. If the wireless network that the flash drive joined is internet enabled, the drive may serve as a private cloud storage device in which the user may access files through the Cloud Server. Additionally, even when a WiFi or WiGig network connection is not available, the Bluetooth wireless component enables the support of such features, conveniently, on a wireless basis. Also WiFi networks may not be trusted for the purpose of the functions described.

The Bluetooth wireless communication range on most phones is typically maximum 30 feet however, by reducing the power output of the wireless component we can reduce that range. Reduced range reduces security vulnerabilities because wireless sniffers, packet captures, or any other tools known to those skilled in the art of security would have to be within wireless range to capture authenticate data to be able to crack the password. Bluetooth would ensure that only users close to the device may authenticate. Bluetooth devices also do not have the ability to connect to home networks this is particular important in the case where malicious software is installed on any of the computer devices within the network that could comprise security. Bluetooth may thus be used for authenticating with the wireless flash drive and accessing features such as battery status, transfer status, configuring LED and various device settings. If the device only had WiFi the user would only be able to do only one thing at a time for example, start a file transfer (would not be able to read the status until it's done). The other issue with using WiFi is that most users have tablets or smart phone that they wish to use with a wireless flash drive. However, many of these users use WiFi for their internet connection, for a smart phone to connect directly to the flash drive the user would have to disconnect from the internet. This is an undesirable effect for many users. Further, recent tablets and smart phones typically have both Bluetooth and WiFi and as such both of these can be enabled at the same time. In this case, Bluetooth would be used for authentication and reading and configuring the flash device. The flash drive's WiFi may be either connected to the users WiFi directly (which may be undesirable) or connect to the users WiFi network at which point the user may access the files without disconnecting to the WiFi internet (if they are connected).

In one aspect, the wireless secure data storage device incorporates encryption/decryption features in order to enable data transfer in a secure manner. Examples of suitable encryption features for embedding in the wireless secure data storage device were described above and are described further below more particularly with reference to the figures.

In one aspect of the invention, a wireless data storage device is provided that includes: a) a CPU, b) a wireless transceiver, c) a power module, d) a controller (with flash controller capabilities), e) an electronic switch, f) one or more memory devices (for example at least one flash memory), and g) one or more antenna, wherein the wireless secure flash drive is configured with one or more wireless interfaces.

In another aspect of the wireless secure data storage device of the invention, the device and its hardware and firmware components may be provided in a manner that enables incorporation of security features, and also of tampering counter measures. The embodiments described below with reference to the figures enable incorporation of security features such as those required for FIPS-3 or FIPS-4 compliance, while providing the convenience enabled by the wireless features described.

The incorporation of the wireless features into the data storage device of the present invention also can improve security for example by enabling updates to encryption algorithms, and wireless exchange of encryption keys.

The design for wireless secure data storage device of the invention may enable the use of third party components for example for the integrated circuit described in connection with certain of the figures below, which may be used to provide functionality similar to a token key.

In another aspect, the electronic switch is connected to the controller, and is configured to close or open access to the flash memory.

The wireless interfaces may include one or more of a USB interface, a SATA interface, a PCI-Express interface, a Bluetooth interface, a WiFi interface, or a WiGig interface.

In another aspect of the invention, the data storage device is implemented as a USB device (including the components described), where the wireless data storage device does not require additional software on the host device.

In another aspect of the invention, an embodiment is provided wherein the WSDSD disposed as a flash drive is provided including the components described, and that supports a wireless encrypted communication mechanism for connecting to a host device consisting of a wireless device such as a smart phone or a tablet computer. In another aspect of the present invention, the controller is configured to perform data encryption/decryption while communication with flash memory is active.

In another implementation of the data storage device, the CPU is coupled with the wireless transceiver to provide bi-directional secure authentication with an external wireless device.

In another aspect of the invention, the flash drive embodiment is configured to permit data exchange with the external wireless device. The flash drive may be configured to receive firmware upgrades. More specifically, the flash drive may be configured to download new firmware while in idle mode, including over the air. In one example implementation the flash drive can receive firmware through one or more of the USB, SATA, PCI-Express, WiFi, WiGig or Bluetooth.

In another possible implementation of the present invention, a wireless data storage device is provided including: a) a CPU block containing a controller; b) a wireless transceiver; c) a power module; d) one or more flash memory; and e) one or more antenna; wherein the CPU and one or more flash memory are integrated into one single chip.

In another aspect, the CPU block communicates with the wireless transceiver using a bus interface.

In another possible implementation, the wireless transceiver and the power module may also be integrated to a single chip.

In another possible implementation, the single chip integrates the electronic switch described above.

In another aspect, the power module recharges the rechargeable battery. In another aspect, the power module recharges the battery when the wireless data storage device is powered by the USB host.

In another aspect, the wireless data storage device of the present invention includes one or more antenna.

In another aspect of the invention, the data storage device may include a wireless interface such WiFi, Bluetooth, WiGig, proprietary high speed wireless interface.

The data storage device, in one aspect, does not require proprietary software on the host device.

The data storage device, in one aspect, includes a GPS module.

The data storage devices, in one aspect, includes a cellular module. The data storage drive, in at least one embodiment is a module.

The data storage devices, in one aspect, consists of a plug-in device.

The data storage device, in one aspect, is implemented as a board.

In one embodiment of the invention, the device is configured as a module or a board embedded in an electronic device.

In another aspect, the data storage device contains at least one interface such as PCMCIA, CardBus, SPI, IEEE 1394, I2C, Ethernet, Thunderbolt, WiFi, Bluetooth, and other interfaces known to those skilled in the art. The module or board may then be used within new or existing hardware devices to add additional storage and capabilities.

Embodiments of systems for secure storage comprising a WSDSD interoperating with a cloud server will now be described.

In an aspect of the invention, a cloud management server (or "Cloud Server") may be provided for providing one or more services for managing functions related to the data storage device. For example, the cloud management server may include or be associated with programming for (A) assigning one or more users per data storage device, or (B) assigning user access privileges at a file, folder or partition level, including associated encryption or authentication, as further described below.

The wireless communication features of the wireless secure data storage device described previously may be used to enable wireless communications between the wireless secure data storage device and the cloud management server directly, without the need for an intermediary communication device.

The wireless secure communication device in combination with the cloud management server enables a number of different innovative solutions and use cases further described below.

The cloud management server may be used for example to configure the wireless secure data storage device to (A) define different secure files, folders, or partitions, where (B) optionally different encryption may be associated with certain of such files, folders, or partitions. For example, the cloud management server may define selective encryption for one or more of such files, folders, or partitions, or in fact field level encryption if this is required.

Also, given the wireless features of the wireless secure data storage device described, configuration of such files, folders, or partitions, and the associate security features including encryption, may be configured or reconfigured on a wireless basis, without the need to connect to a computer. This provides flexibility in enabling frequent updates to security measures, which itself improves security. Also, security can be managed as between the data storage device and the cloud server (which itself is secure), without the need to access another computer, whose security may be compromised.

The cloud management server enables an administrator, by logging into a secure server, to manage efficiently a plurality of wireless secure data storage devices of the present invention, without compromising the security of the solution.

In addition, the cloud management server may enable: assigning users for each device; assigning access privileges to users at a file, folder or partition level with encryption type and authentication; determining last location known; execute functions including a) format/erase, b) partition data, c) restrict formatting the file system from the OS, d) configure the data storage device to work in a network, e) once devices are connected together an aggregation of their respective file systems can be shown in an aggregated view presented by the cloud management server, that also allows users to access all files linked to all of the connected devices.

Embodiments will now be described for unlocking the WSDSD based on a locational indication, as will be described below in additional detail with reference to the drawings.

The wireless secure data storage device of the present invention may include a cellular component and also optionally a GPS module. This enables embodiments of the wireless secure data storage device that are configured to unlocked/lock based on location. The location could be a proximity of another wireless device such as the host device (smart phone, tablet, another USB), multiple wireless devices or GPS coordinates.

In one possible implementation, a wireless secure data storage device including a proximity sensor may be unlocked automatically when a host device is determined based on wireless proximity sensing to be within a specific range, and conversely the wireless secure data storage device may be locked when a host device is determined based on wireless proximity sensing not to be within a specific range.

In one implementation, the device acts as a proximity sensor, and the proprietary program includes computer instructions for providing enhanced security based on proximity to one or more devices.

In one example, the device transmits a communication to one or more other devices indicating that the data storage device is within proximity, which communication may include information from which the location or approximate location for the device may be determined. A smart phone for example receives this communication and can establish an approximate distance between the smart phone and the data storage device. This approach has a number of possible advantages. When a user leaves the data storage device behind (implemented for example as a USB), an associated smart phone can remind the user that they left it behind. This would reduce the chance of losing USBs, which may result in the loss of important information.

In another possible implementation, when a data storage device is lost (implemented for example as a USB), one or more smart phones in the area may pick up a broadcast and notify the cloud management server. The cloud management server could then provide a notification to the owner of the lost USB with information for retrieving the data storage device, including for example its approximate location. Alternately, in such embodiments, once lost the device may itself connect to the cloud management server to send a notification indicating that it has become lost.

In one aspect of the invention, a data storage device includes a file storage system and a CPU, and the CPU is configured to authenticate an external wireless device and allow the external wireless device to unlock access to the file storage system.

Other aspects of the invention will now be briefly described.

The invention may use one or more layers of security to reduce the risk of intrusion. Some of these security protocols may consist of one or more of the following: a session key, a certificate, a password, voice recognition, face recognition, pattern recognition, a fingerprint scanner, an iris scanner, a specific hardware host, a hardware key, multiple users, and proximity to a specific smart device or a specific geo location to gain access to the data storage device of the invention.

The wireless secure data storage device of the invention may be implemented as a USB drive incorporating Bluetooth functionality. It may also be used to provide improved security to solid state drives (SSD) or typical spin hard drives (HDD).

The device may be configured to be unlocked/locked based on location. The location could be a proximity of another wireless device (smart phone, tablet, another USB), multiple wireless devices or GPS coordinates. This allows the definition of location based rules for managing security of the wireless data storage device. For example, a user may want the device to unlock automatically within a trusted environment such as the user's house. However, if the wireless data storage device is accessed elsewhere, the device may be locked by default until someone authenticates with the device to unlock it.

In another aspect, the device may include a cellular modem and optionally a battery to provide tracking capability and connectivity to a cloud server independent of any associated device. This enables not only tracking for example of a drive including sensitive information for recovery, but also provides connectivity to the cloud management server for erasing of data or selected data from the drive. These features will operate independent of the operating system, which will avoid circumvention by initiating for example erase functions via the operating system.

In one aspect of the invention, one or more of the devices described in this disclosure may form a wireless network. The nodes within the wireless network may act as a wireless RAID file system with the option of different encryption and credentials on each node. Devices within the network may transfer files between each other, a smart device or to a cloud server. The network may also be used to increase capacity, increase read and write performance known as RAID 0. Other RAID formats may also be configured between the devices such as RAID 1 which allows data mirroring, or other more complex RAID formats which may combine a mix between redundant data and increased throughput. Nodes within the wireless network may also be configured as individual file systems. Proprietary software may aggregate all the content into one view with the capability of file manipulation including but not limited to stream, copy, delete, read and rename.

Illustrative examples of use of embodiments of the WSDSD will now be described.

The WSDSD device may be implemented as a USB flash drive, which may include LED lights to indicate one or more operating modes of the flash drive. The USB flash drive may be inserted into a USB host. If the USB flash drive is in a "locked" position then a particular light indicator may be initiated such as "RED". This may suggest that one or more of the security features of the device (as described) may be locked, and need to be unlocked. For example a host device must be brought into proximity of the USB, or wireless authentication using a host device needs to be initiated. Once the USB flash drive is "unlocked", the light indicator may change for example to "GREEN" and now the USB flash drive may be used as a regular data storage device.

In one example, the device acts as a wireless secure key to unlock other wireless devices within proximity when the device is authenticated successfully by the user. Such other devices could be a wireless lock on your home door, a car door, engine start/stop or any other device with wireless capabilities that requires security. The advantage of this would be two fold, one the user needs to be within at most 30 feet of the device and two the wireless secure key would need to be unlocked by the user using Bluetooth to initiate unlocking of any other devices.

In another example, the device can be used as a proximity parental control device. With additional software on the host device, parental controls may be enabled on the computer such that children cannot access various features on the OS. Once the parent arrives home, they authenticate with the wireless key, upon unlocking the device the OS automatically recognizes the device as a parental control key and removes parental controls from the host device.

In an implementation of the invention, where a wireless secure data storage device is used in connection with a cloud server, the solution may require: (A) a user to define credentials for authenticating to the cloud server; (B) the user using the credentials for accessing various features for managing his/her wireless secure data storage device, including for example (i) confirming status of the device (whether locked or unlocked), (ii) status of available wireless connectivity to the data storage device, (iii) defining parameters of the host device, (iv) status of the host device such as proximity to the data storage device, (v) defining parameters for geolocation features, (vi) managing events such as a lost or stolen data storage device.

In one possible implementation, a data storage device of the invention may be unlocked by (A) a user signing into the cloud server, and (B) the cloud server initiating the unlocking of the data storage device on a wireless basis, whether based on authentication of the data storage device to the cloud server, or the cloud server initiating the authentication of a host device to the data storage device.

In the following, various embodiments of the WSDSD as well as associated systems and methods will be described with reference to the drawings.

Shown in FIG. 1A is a diagram illustrating a possible embodiment of a WSDSD.

WSDSD 100 contains one or more data transfer interfaces that provide file storage and transfer capabilities when wired or wirelessly (via the wireless communication component) connected to a computing device. WSDSD 100 can act as a file storage device over the one or more interfaces, which may comprise USB 102, SATA 111, PCI-Express 114 or other interfaces known to those skilled in the art, including PCMCIA, CardBus, SPI IEEE 1394, I2C, Ethernet, Thunderbolt, WiFi, WiGig, Bluetooth, and Serial.

Bus interface 109 shown in FIG. 1A provides a method of communication known to those skilled in the art, including but not limited to GPIO, SPI, I2C, One-wire, Parallel and Serial between internal components, 102, 103, 104, 105, 106, 111 and 114.

A processing unit, comprising the CPU 106, performs calculations, hosts the application programming interface (API) and provides the firmware to communicate with the radio transceiver 107. The CPU enables the WSDSD to interact via the wireless communication component and it further performs the encryption/decryption for messages sent and received from the host devices (or other devices). The CPU may further be configured to match received authentication data against a stored secret key. The CPU is further configured to interact with other devices and chip components, in particular the electronic switch to open or close access to the data stores. In various embodiments, data in memory may further be stored in encrypted format and may be decrypted by the CPU (or data controller 104) during read/write operations.

Data controller 104 can be associated with one or more memory data stores 105 to provide faster read/write speeds or extended file storage capacity. The controller is a dedicated CPU to handle high speed data between the USB or other interface(s) and the memory interface (data stores). The controller sometimes may have data encryption and decryption features built-in so that this can be accomplished on the fly with the data stores. If the controller has encryption/decryption capabilities it may only manage the data in the data stores rather than also authenticate the user.

In some embodiments, a separate CPU and data store controller are not included, and a single CPU block performs all encryption/decryption operations of the user and messages, as well as controlling access to the data. The term processing unit is thus used herein to generally refer to the CPU and data controller which may in some embodiments comprise one or more separate CPUs.

Electronic Switch 103 is coupled with the CPU 106 and can enable or disable access to the file storage system. More particularly, the electronic switch 103 opens and closes the state of pins (e.g. using a GPIO, bus interface 109) connecting the external interface (USB, PCI-express, etc) to the controller (or CPU, if no separate controller is included). Without a physical connection to the controller it is difficult to gain access to the memory (data stores), particularly in the embodiments as described in reference to FIG. 1B below where components are embodied into a single integrated circuit chip. In traditional methods, the controller has encryption/decryption built-in and the security is solely reliant on the basis that even if a malicious user gained access to data stores it wouldn't be able to decrypt the data without the user's password. Methods such as maximum number of tries after which the controller erases decryption key have been implemented to stop tampering, but these do not prevent the malicious user from doing a brute force attack or accessing and cloning the memory.

The device comprises one or more wireless communication components to communicate wirelessly, including in order to receive authentication data. The wireless communication component comprises a radio transceiver 107 to communicate over one or more wireless protocols such as Bluetooth, WiFi, WiGig or other protocols known to those skilled in the art, including Zigbee, RF4CE, Thread, 6LoW-PAN or IEEE 802.15.4 protocols. One or more antenna 110 may be connected to radio transceiver 107. Where the one or more data transfer interfaces for the data stores are wireless, the data transfer interfaces utilize the hardware of the wireless communication component for communication.

Power module 108 controls the voltages provided to the various components 103, 104, 105, 106 and 107.

Figure 1B:
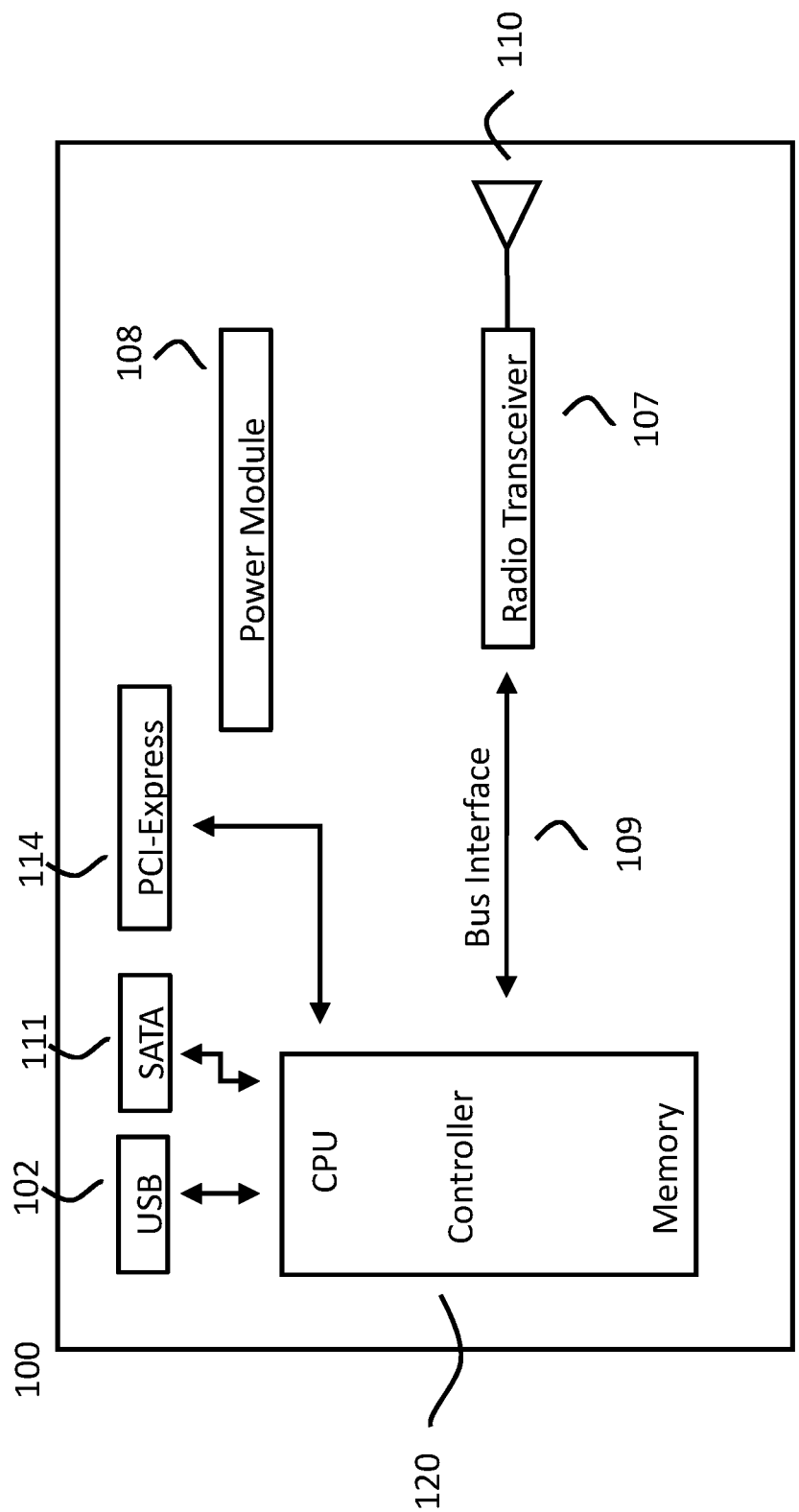
FIG. 1B shows a block diagram of a representative implementation of the WSDSD where the CPU, controller, and one or more memory devices are combined in a single chip.

Referring to FIG. 1B, an implementation of the WSDSD 100 is illustrated which includes the CPU, controller and memory (as described in connection with FIG. 1A for example) embodied into a single integrated circuit chip 120. In various embodiments, internal components of the WSDSD are provided in single IC to prevent tampering, e.g. cloning of the memory by directly accessing it to enable a brute force hacking attempt. Moreover, in such embodiments, it becomes difficult to 'skip' the electronic switch and connect the controller and the one or more data stores in order to directly access the memory.

Figure 1C:
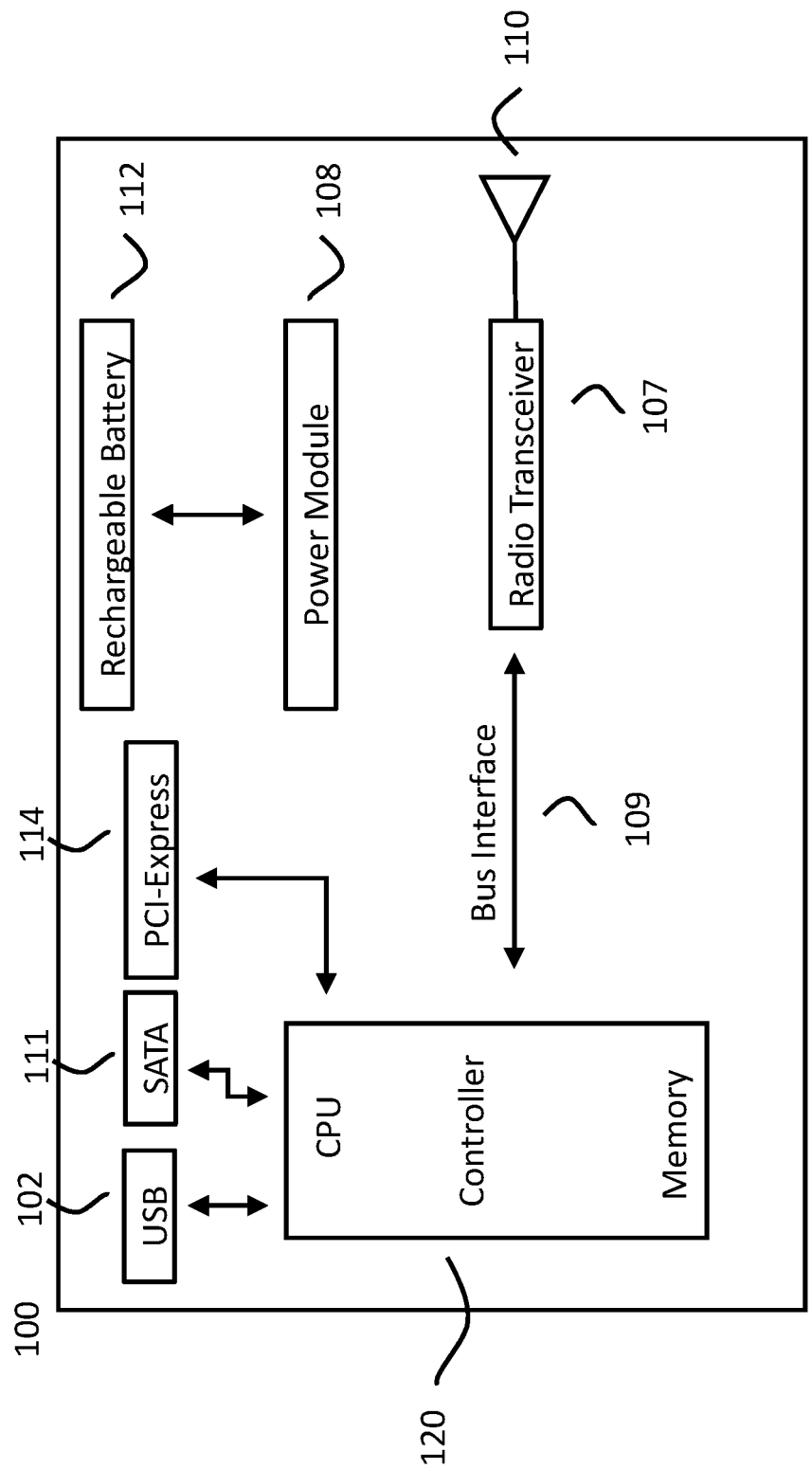
FIG. 1C shows a block diagram of another representative implementation of the WSDSD, where the data storage device contains a rechargeable battery able to power the device when not connected to an interface.

FIG. 1C, shows a WSDSD further comprising a rechargeable battery 112 connected to power module 108, having the ability to charge the battery when the WSDSD 100 is connected to a power source.

Figure 1D:
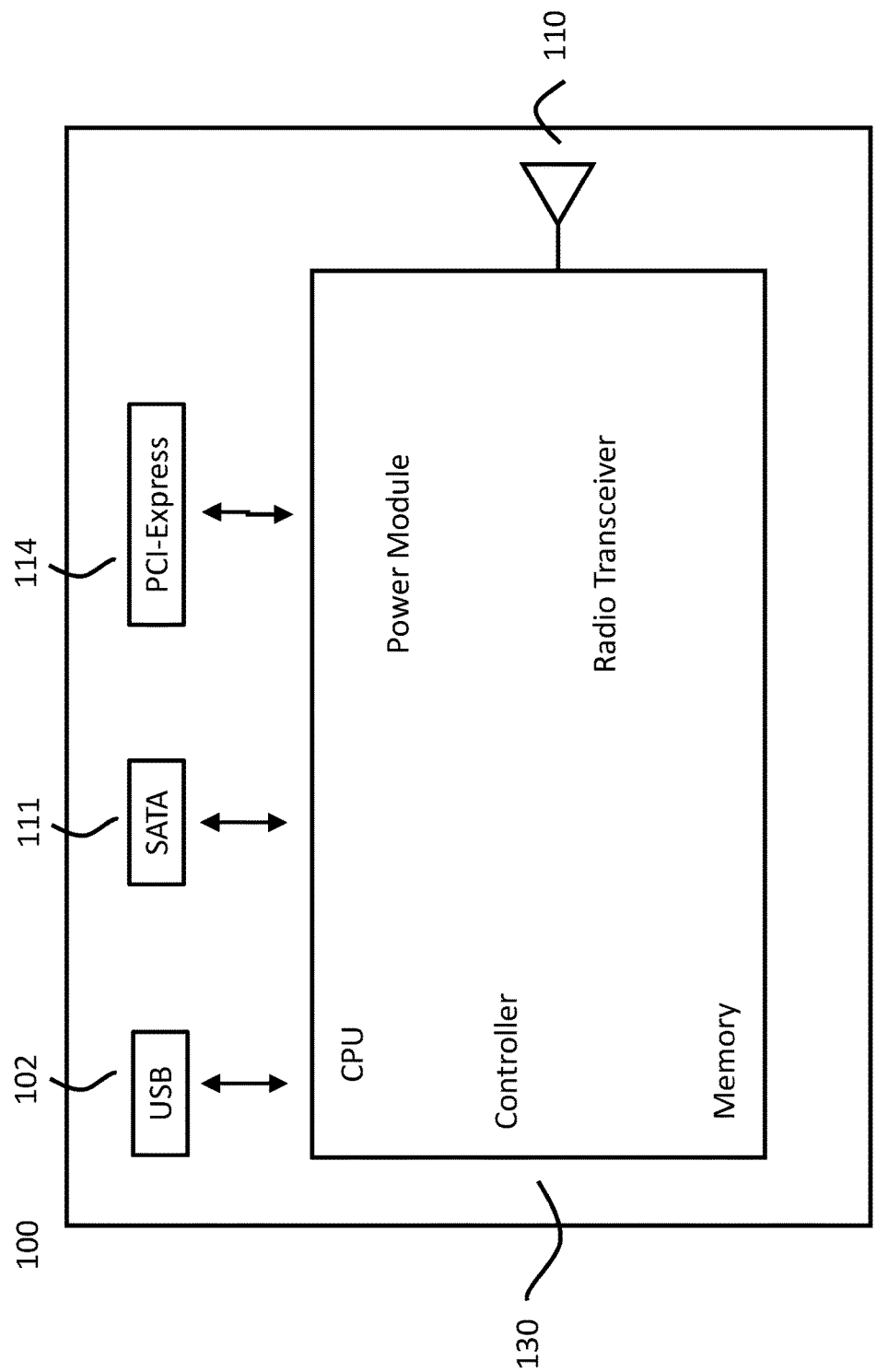
FIG. 1D is a block diagram of another representative implementation of the WSDSD, in a particular embodiment where the CPU, a controller, one or more memory devices, a power module and one or more radio transceiver(s) are combined into a single chip.

FIG. 1D illustrates a design for the WSDSD based on the invention which includes the CPU, controller, memory, power module and radio transceiver embodied within a single chip 130.

Figure 1E:
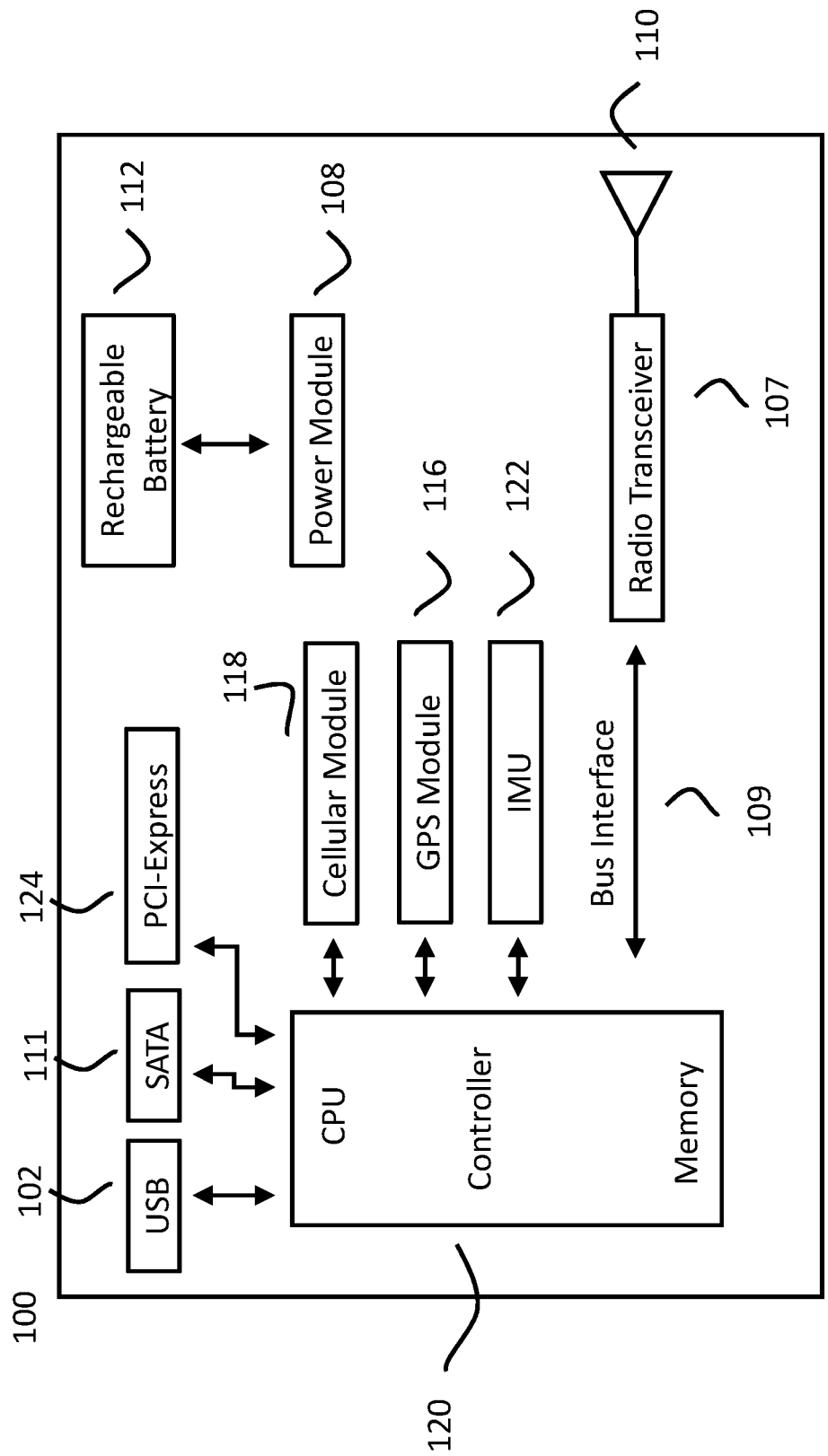
FIG. 1E shows a block diagram of another representative implementation of the WSDSD, containing a cellular module and further a GPS module for geolocation as well as an inertial measurement device for anti-theft, unauthorized movement of the device, fall detection and other information that may be gathered from inertial sensors.

FIG. 1E, illustrates a design of the WSDSD 100 based on the present invention, including the functionality of the design shown in FIG. 1C, plus including a cellular module as previously described. Cell module 118 can be provided to connect to one or more cellular networks which may include 5G, CDMA, LTE, UMTS, GSM, HSDPA, HSUPA, HSPA+, TD-SCDMA, WiMAX or other cellular networks types known to those skilled in the art. The cellular module 118 may be used to transfer information from the WSDSD 100 directly to the Cloud Server 202 without requiring an external host or operating system.

The block diagram of FIG. 1E also shows a GPS module 116 used for geolocation tracking of the WSDSD 100 anywhere in the world. The GPS module 116 may be capable of using one or more satellite technologies including but not limited to GNSS, GPS, GLONASS, Galileo, IRNSS and BeiDou. The GPS module 116 in combination with the cellular module 118, can notify the Enterprise Solution Manager System ("ESMS") 210 of the exact position of the wireless secure data storage device. Further, included is an inertial measurement unit (IMU) 122, this can consist of one or all of the following, accelerometer, gyroscope or magnetometer. The IMU can be configured in such a manner that any movement to the WSDSD 100 will trigger an unauthorized movement event. Events are configured in the ESMS 210 to perform one or more actions which include, but is not limited to email notification, disabling the device, format the device and enable geolocation tracking.

Figure 2:
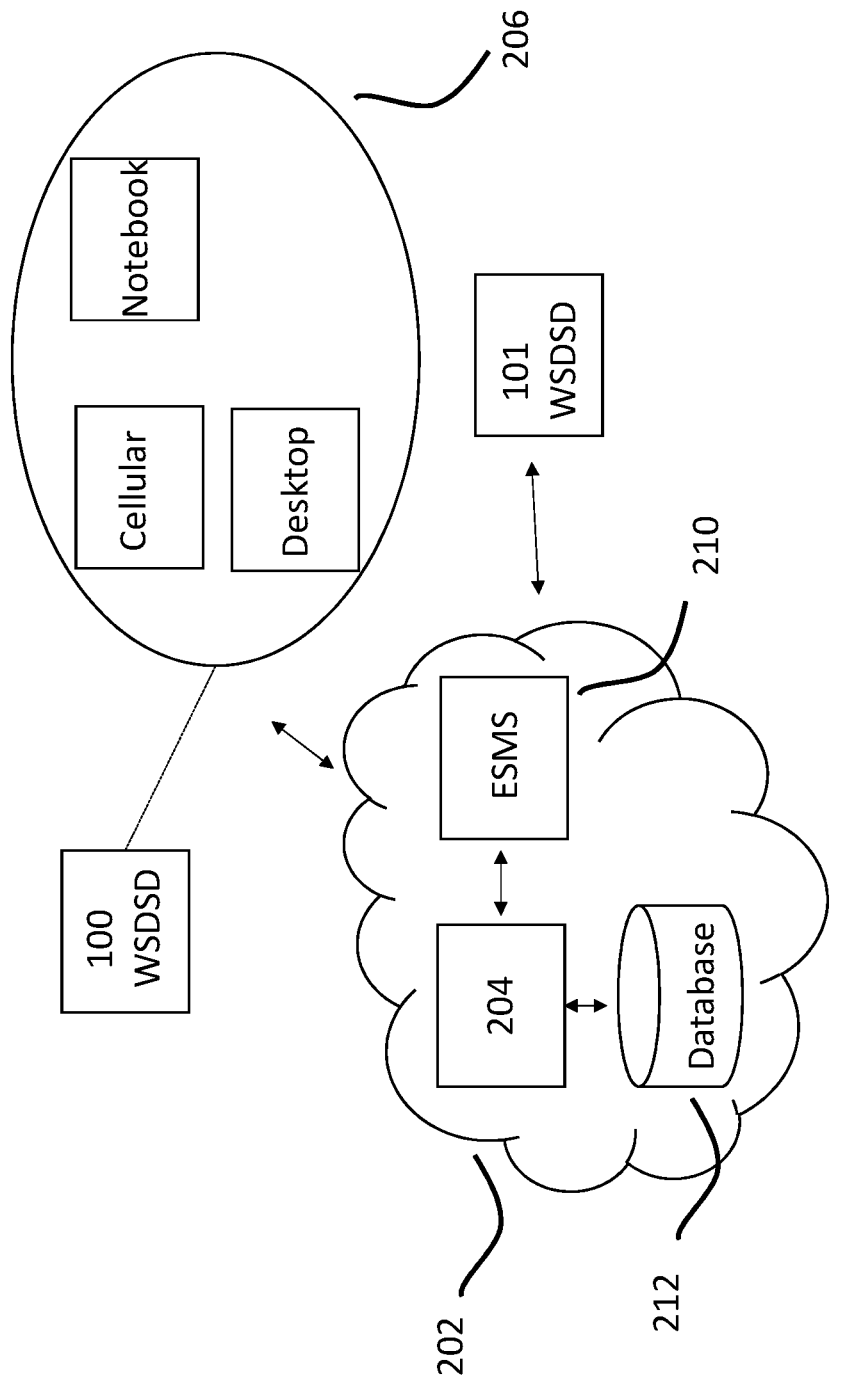
FIG. 2 shows a block diagram representing a system for secure storage, where a cloud server communicates with smart devices implementing the data storage functions of the present invention in order to change settings for the wireless secure data storage drive.

FIG. 2 illustrates an example system for secure storage comprising a WSDSD 100 interoperating with a cloud server 202 and a smart device ("SD") 206. Particularly, FIG. 2 illustrates certain features of the Cloud Server 202, and also possible implementations for the Cloud Server, as previously described in brief.

Cloud Server 202 may be implemented as an Enterprise Solution Manager System ("ESMS") 210. The ESMS 210 contains all the security and configuration settings that are uploaded to the WSDSD 100. One or more administrators may allocate the authority to assign access to users that ultimately use the WSDSD 100. The features within ESMS 210 may range for example from granting security access to users, setting beacon intervals, RAID (Redundant Array of Independent Disks), encryption type, network devices, proximity based security settings, parameters for marking a device as lost or stolen, rules for defining actions or events related to security, usability and accessibility.

Block 204 may consist of one or more applications that process, transform or execute requests from ESMS 210 to the Database 212.

The Database 212 may store various information pertaining to users, administrators and configurations for the various WSDSD 100.

In one aspect of the invention, Cloud Server 202 may be configured so that access privileges may be granted to users at the file, folder and partition levels. Each file, folder or partition may have different authentication protocols or cryptography methods used such as AES 256, RSA, DSA, password or other secure methods or algorithms known to those skilled in the art. This allows individuals and companies to have full control of the granularity of security on the device.

Administrators may also configure the WSDSD 100 using the Cloud Server 202 to require more than one user to wirelessly authenticate with the device to unlock access to the file storage system. For example, using the ESMS 210, an administrator may create new or hidden partitions on the WSDSD 100 file system that only specific users may view and access. Using the same method, the device can be configured in such a way that the file system cannot be erased using any operating system such as Windows, Unix, OS X, Android, iOS and other similar systems known to those skilled in the art. Further, in some embodiments, after a configured amount of unauthorized attempts or if the device is set as lost or stolen within ESMS 210, the device can perform several tasks such as wipe the file system at the bit level, erase the index sectors, create a new partition and set the old partition as hidden, or other features as set out in the ESMS 210 settings. Once the device is marked as lost or stolen, the WSDSD 100 may try to initiate a secure outbound connection to an external file server. Once a secure connection is established, the device will start uploading the contents of the file storage system to the external file server.

FIG. 2 shows additionally a SD 206 which may be provided based on the invention. A Smart Device (SD) consists of any host device that is configured to access the Cloud Server 202, such as a mobile device, notebook, desktop computer, tablet computer, while also being capable of wirelessly authenticating a user to the WSDSD 100. In the case that the WSDSD 101 contains a cellular module, it may communicate directly to the Cloud Server 202 by establishing a secured connection and authenticating directly with the ESMS 210 without requiring an additional Smart Device.

The SD 206 may connect with the WSDSD along certain wireless communication channels for authentication and file transfer, and may further communicate through a cellular channel with the ESMS 210. The SD 206 could alternately connect with the WSDSD using a wired interface for file transfer while connecting wirelessly for authentication.

The SD 206 may communicate with the ESMS 210, receive (or upload) updated configuration settings for the WASDSD 100, and provide the new configuration settings to the WASDSD 100. The cellular connection of the SD 206 may thus be of use to enable receipt of configuration settings from the ESMS 210 to the WASDSD.

In some embodiments, the WSDSD 101 includes its own cellular communications module, such that it can directly connect to the server 202 to receive configuration settings without relying on the smart device. The WSDSD can then download configuration data and sync files with the ESMS ("cloud drive") without the need of an external connection. As an example, in the event a user marks the WSDSD as "lost" at the ESMS and the WSDSD downloads this information, it can lock the data store indefinitely. The cellular communications module may also be used to locate the WSDSD based on cell tower triangulation, or other features.

In a possible implementation of the illustrated system, WSDSD 100 requires wireless authentication to enable access to the file storage system in memory. The particular authentication method may be changed by either the ESMS 210 or a SD 206 capable of authenticating with the device. In one case a SD 206 includes proprietary software (as previously described) required to connect to the WSDSD 100 and start the authentication protocol. The authentication protocol may require one or more of a session key, certificate, password, voice recognition, face recognition, pattern recognition, fingerprint scanner, iris scanner and/or other security measure known to those skilled in the art. In another case the WSDSD 100, can be unlocked by a Hardware Key Protocol ("HKP") 300 as described below.

Alternatively, the device 100 may be unlocked by being within the proximity to one or more SD 206. Further, the security layer may include a notion of geolocation configured through the ESMS 210. Geolocation information for the WSDS 100 may be obtained from the SD 206 using the built-in Global Positioning System ("GPS"), cellular triangulation, LED based indoor location detection technology, ultrasound beacon, iBeacon or other location systems known to those skilled in the art. In some cases, geolocation can be obtained by using wireless triangulation from a set of WSDSD 100 or a set of SD 206 that are configured to wirelessly broadcast their location. WSDSD 100 may include for example a built-in GPS or cellular module that may have the ability to obtain the geolocation from the built in hardware and cellular triangulation. The WSDSD 100, may store the allowed geolocation information within the internal memory or alternatively can query the ESMS 210 to obtain the geolocation information which allows the device to unlock when the user enters that area. Examples of configurable geolocation features include locking, unlocking, quick format and bit level format. This provides additional security where there is a requirement that data only be accessed from a specific location.

The WSDSD 100, may be configured to authenticate when a specific interface host ID is identified, such as a USB host ID, or any other interface described in this invention. Authentication for the WSDSD 100 may consist of one or more methodologies mentioned or similar techniques WSDSD 100 can be implemented as module, board or plug-in device. WSDSD 100 can be used in existing or newly designed devices to provide a secure file storage system and additional functionality.

As previously stated, WSDSD 100 (in accordance with one or more of the implementations described) may not require proprietary software (for example to unlock the WSDSD 100) when connected via USB 102, SATA 111, PCI-Express 114 to a host device containing an operating system including but not limited to Windows, Linux, Unix, Android, iOS or other systems known to those skilled in the art, containing generic drivers for data storage drives.

In one possible implementation of the invention, the WSDSD 100 contains a unique identification serial number for the wireless interface used to identify the device. The serial number is programmed at the manufacturer and cannot be altered. In some particular instances, the serial number may be reprogrammed by using an interface communicating with the API or a firmware update.

In one possible implementation, WSDSD 100 turns into a proximity beacon when in idle mode, broadcasting its serial number at regular or variable intervals. The term "idle" may refer to when the WSDSD 100 is not reading or writing to the memory or is in a wireless configuration mode. In some cases the serial number is encrypted and can only be decrypted by a SD 206 connected to ESMS 210. In another case the serial number broadcast is not encrypted and is used for location tracking. When the SD 206 goes out of range of the proximity beacon, the application may remind the user that they may have left the WSDSD 100 unintentionally. In wireless configuration mode, SD 206 capable of interfacing with the device can read or write settings stored on the WSDSD 100.

WSDSD 100 may be configured to actively check for new firmware versions when connected to interfaces such as USB 102, SATA 111, PCI-Express 114, or other said interfaces. The device will only download and install new firmware when in idle mode.

WSDSD 100 may be configured in such a way that the file storage system is encrypted. The CPU 106 or alternatively the controller 104 encrypts and decrypts information from one or more interfaces including but not limited to USB 102, SATA 111, PCI-Express 114 during read/write operations. The file storage system can be encrypted for example with AES 128 bit, 256 bit, or other secure encryption algorithms known to those skilled in the art.

Figure 3:
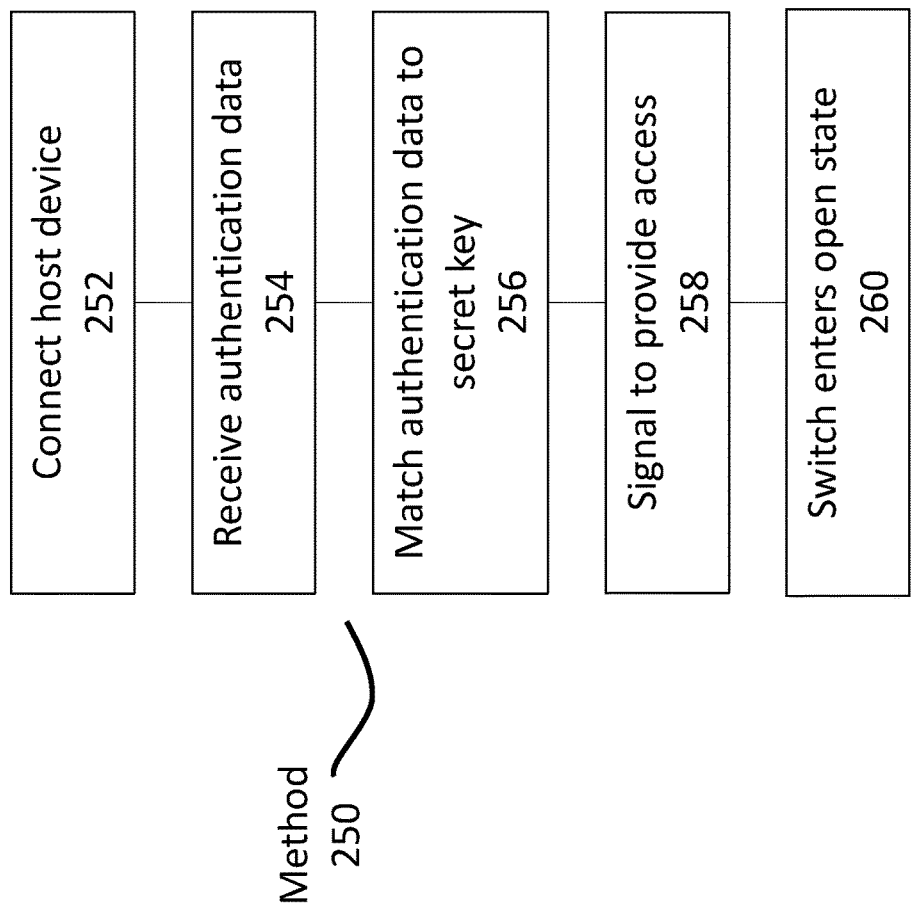
FIG. 3 shows a method of using a WSDSD.

Referring now to FIG. 3, shown therein is a method 250 of wirelessly authenticating a user to a WSDSD, such as the WSDSD 100, for permitting access to the files secured thereupon.

Block 252 comprises wirelessly connecting a host device (such as a smart device 206) to the WSDSD for commencing an authentication protocol.

Block 254 comprises receiving from the host device, by the wireless communication component of the WSDSD, authentication data to be authenticated. The authentication data comprises data to be matched against a stored secret key. The secret key may relate to a session key, certificate, user password, voice recognition information, face recognition information, pattern recognition, fingerprint scanner, and/or iris scanner information. The secret key may comprise such data converted to an alphanumeric form (whether the conversion occurs at the host device or at the WSDSD). The secret key may further include data relating to the host device, e.g. device identification IDs or interface IDs. In many embodiments the secret key is encrypted using the WSDSD's public key.

Block 256 comprises matching, by a processing unit of the WSDSD, the authentication data against a stored secret key to authenticate the user.

At block 258, once the authentication data is confirmed to match the secret key, the processing unit communicates a signal to the electronic switch to provide access to its file store.

At block 260, the electronic switch of the WSDSD enters an open state, permitting access to the locally stored files through the interface to a connected device (whether wired or wirelessly). For example, at this block the electronic switch may unlock a pin of an interface connected to the WSDSD' data stores.

Figure 4:
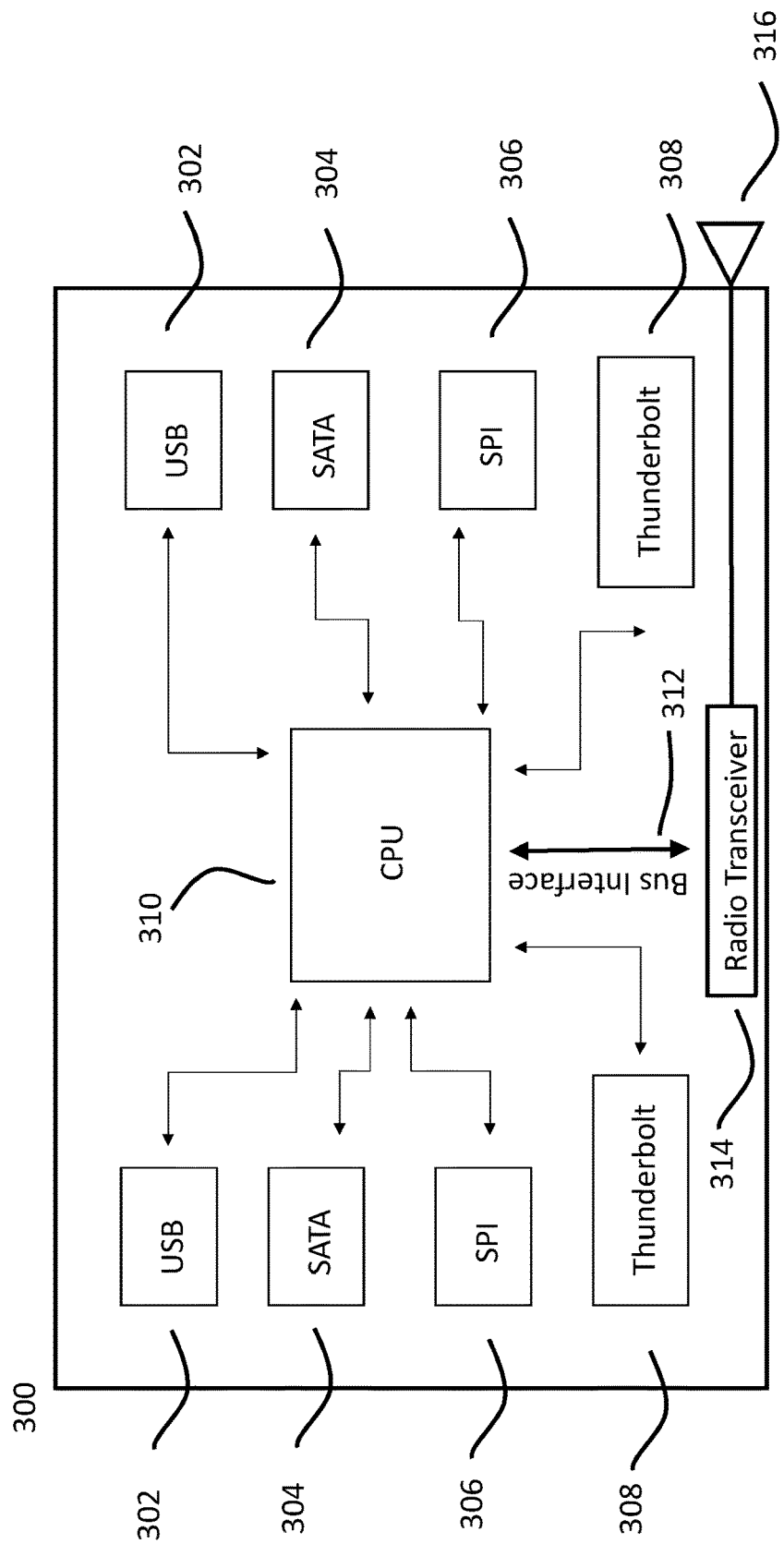
FIG. 4 is a block diagram illustrating another embodiment of invention WSDSD that utilizes a hardware key protocol used as a hardware authenticator for the present invention.

Referring to FIG. 4, the Hardware Key Protocol ("HKP") 300, consists of a CPU 310 capable of real-time encryption and decryption of cryptographic algorithms. The HKP consists of at least two interfaces, one inbound and another outbound interface. The inbound and outbound interfaces may include USB 302, SATA 304, SPI 306, Thunderbolt 308, or other interfaces known to those skilled in the art. The inbound interface connects to the WSDSD 100, and the outbound interface connects to the host device. A separate bus interface 312 for the wireless radio transceiver 314 with one or more antenna 316 may be used for an additional security layer. The wireless radio is capable of Bluetooth communication used for authentication. The HKP 300 CPU 310 can interpret one or more authentication protocols, including proprietary cryptographic algorithms for highly sensitive data.

Figure 5:
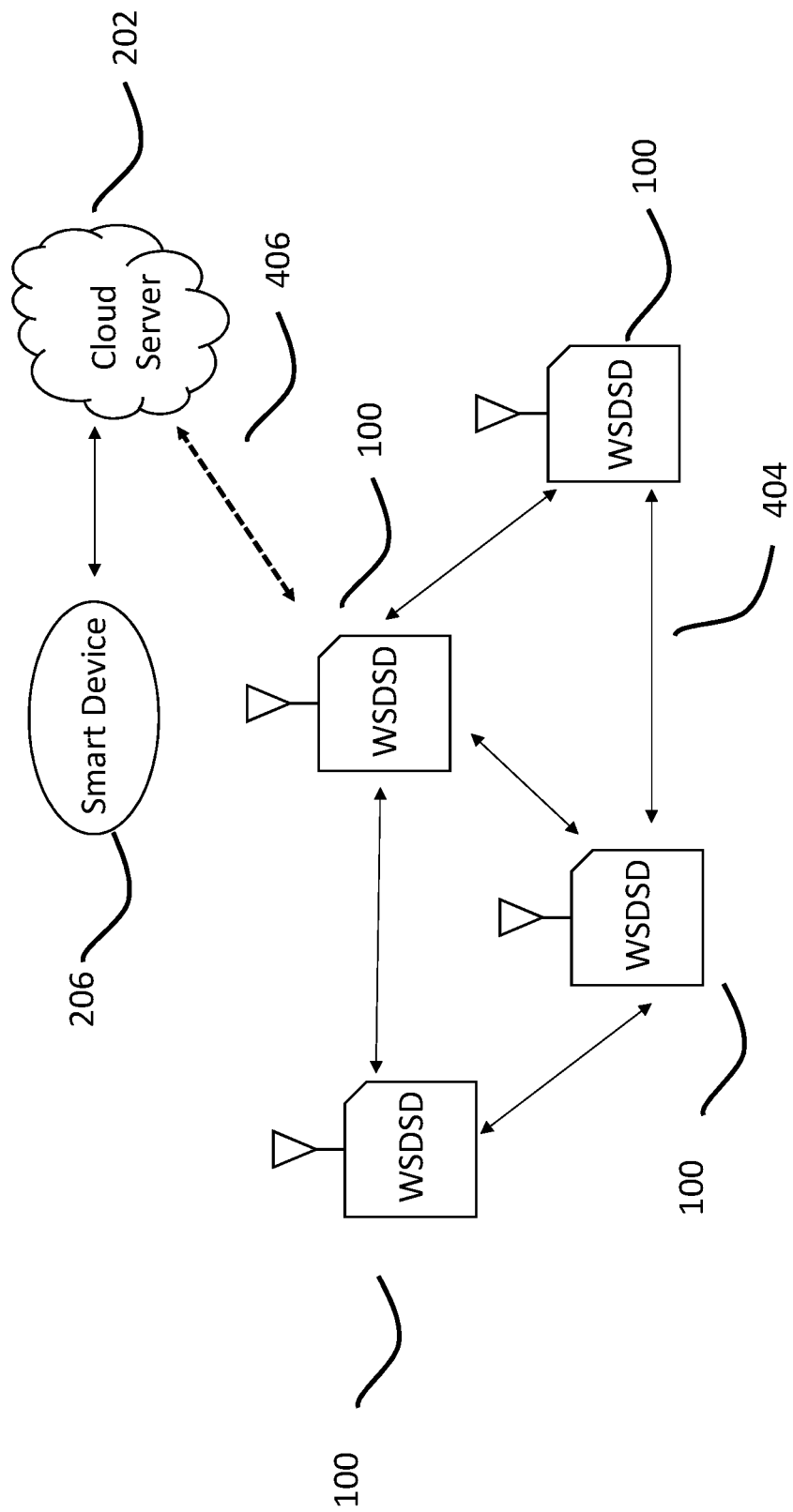
FIG. 5 shows a block diagram of a system for secure storage comprising a plurality of wireless secure data storage devices of the invention forming a network and communicating with the cloud server.

Shown in FIG. 5, is a block diagram of a system for secure storage. The system comprises a multiple WSDSD 100 that can form a network. The devices within the network are specified by either the ESMS 210 or a SD 206. Once a Secure Wireless Connection 404 is established, the nodes can securely move information between each other. A "Node" refers to a WSDSD 100 within a network. Nodes may be setup using ESMS 210 as RAID devices. Files stored in RAID format may be split into sequences and stored in some or all the linked nodes within a network and each node and sequence may have a separate encryption method. In the situation that a malicious user succeeds to obtain the files from one or more nodes within the network, the files remain incomplete until all the nodes within the network are compromised. The fragmented file system will increase the read and write performance of the stored data as well as significantly improve the security of the information stored on the WSDSD 100. The devices within the network may move files between each other at set or variable times using continuously changing encryption key known only to the network nodes and the ESMS 210 or other continuously changing cryptographic algorithms known to those skilled in the art. This methodology will enhance the security of the file system. The challenge for the intruder is to locate a continuously moving file at a given time as well as finding the correct decryption key during that same period. In some cases where the WSDSD 100 also contains a cellular module 118, a SD 206 is not required for the nodes to communicate with the ESMS 210. In all of the above network formations the SD 206 has a single view of the file system to simplify file management and transfer. In some cases, each WSDSD 100 found within the network maintains its own file system. In such a configuration, the SD 206 or alternatively the WSDSD 100 can aggregate all the file systems within the network into one view using proprietary software on the SD 206 or host system and perform regular tasks such as read, write and other file manipulations known to those skilled in the art. One such example would be to connect one WSDSD 100 to a TV and another WSDSD 100 be connected to a desktop. The WSDSD 100 connected to the desktop may contain multimedia content such as movies, audio or pictures. The multimedia content can now be directly accessed via the TVs WSDSD 100. In the event that a user has multiple WSDSD 100 with multimedia content stored, the devices may be setup to form a network. Once a network is formed the user may access all the multimedia content in one unified view and stream it to the TV without requiring any knowledge of home networking.

In one embodiment of the WSDSD 100, the device may form a secure connection to a SD 206 or to another WSDSD 100. Once the connection is established one or more files may be transferred. The SD 206 can also initiate a clone request triggering the WSDSD 100 to transfer the file system at the bit level creating an exact replica.

In one possible implementation of the invention, a device of the present invention enables wireless RAID functionality, where the wireless RAID functions as a secure file system that does not need to always be connected to a host system (based on the security features discussed previously). As a result, even if the file system is disconnected with the host system or the host system is compromised, the secure file system includes additional security. This particular implementation enables a solution that includes desirable capacity, performance and security characteristics.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

Although the embodiments have been described in detail, it should be understood that various changes, substitutions and alterations can be made herein without departing from the scope as defined by the appended claims.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

The invention claimed is:

1. A wireless secure data storage device comprising:
a data store connected to one or more interfaces for transferring data from the data store;
a processing unit;
an electronic switch; and,
one or more wireless communication components coupled to the processing unit for communicating with a host device for obtaining authentication data, the one or more wireless communications components comprising a cellular communications component, the processing unit being configured to monitor wireless signal strength with the host device and provide a notification to a cloud server upon the wireless signal strength falling below a predetermined value;

wherein the electronic switch and the processing unit cooperate to switch the wireless secure data storage device between a closed state, where data cannot be accessed from the data store through the one or more interfaces, to an open state, where data can be accessed from the data store through the one or more interfaces, upon the processing unit matching obtained authentication data to a stored secret key.

2. The wireless secure data storage device of claim 1, wherein the processing unit, data store and electronic switch are disposed within the same integrated circuit component of the wireless secure data storage device.

3. The wireless secure data storage device of claim 1, wherein in the closed state, the electronic switch locks at least one electronic pin of the one or more interfaces to lock access to the data store.

4. The wireless secure data storage device of claim 1, wherein the processing unit matching the authentication data to a stored secret key comprises converting, by the processing unit, the authentication data to alphanumeric data and matching the alphanumeric data against the stored secret key.

5. The wireless secure data storage device of claim 1, wherein the one or more wireless communication components comprises:
   a first wireless component for wireless transfer of data from the data store when the electronic switch is in the open state; and
   a second wireless component for communicating with the host device for obtaining the authentication data.

6. The wireless secure data storage device of claim 5, wherein the first wireless component comprises one of a Wifi component or WiGig component, and the second wireless component comprises a Bluetooth component.

7. The wireless secure data storage device of claim 1, wherein the processing unit is configured to periodically monitor for wireless signals from a known host device, and the secret key comprises a unique device identification number of the known host device.

8. The wireless secure data storage device of claim 1, wherein obtaining the authentication data comprises receiving the authentication data indirectly from the host device through a wireless hardware key in communication with the host device according to a hardware key protocol.

9. The wireless secure data storage device of claim 1, wherein the wireless secure data storage device communicates with one or more other wireless secure data storage devices to form a network, each wireless secure data storage device providing a node of the network for transferring portions of files of the data from the one or more data stores between the wireless secure data storage devices of the network.

10. A method of authenticating a user to a wireless secure data storage device comprising a data store connected to one or more interfaces, a processing unit, an electronic switch, and one or more wireless communication components coupled to the processing unit, the one or more wireless communications components comprising a cellular communications component, the method comprising:
   obtaining, by the one or more wireless communication components, authentication data from a host device;
   matching, by the processing unit, the authentication data to a stored secret key;
   monitoring, by the processing unit, wireless signal strength with the host device and providing a notification to a cloud server upon the wireless signal strength falling below a predetermined value; and
   switching, by the processing unit and the electronic switch, the wireless secure data storage device from a closed state, where data cannot be accessed from the data store through the one or more interfaces, to an open state, where data can be accessed from the data store through the one or more interfaces.

11. The method of claim 10, wherein the processing unit, data store and electronic switch are disposed within the same integrated circuit component of the wireless secure data storage device.

12. The method of claim 10, wherein in the closed state, the electronic switch locks at least one electronic pin of the one or more interfaces to lock access to the data store.

13. The method of claim 10, wherein the processing unit matching the authentication data to a stored secret key comprises converting, by the processing unit, the authentication data to alphanumeric data and matching the alphanumeric data against the stored secret key.

14. The method of claim 10, wherein the one or more wireless communication components comprises:
   a. a first wireless component for wirelessly transferring data from the data store when the electronic switch is in the open state; and
   b. a second wireless component for communicating with the host device for obtaining the authentication data.

15. The method of claim 14, wherein the first wireless component comprises one of a Wifi component or WiGig component, and the second wireless component comprises a Bluetooth component.

16. The method of claim 10, further comprising periodically monitoring, by the processing unit, for wireless signals from a known host device, and wherein the secret key comprises a unique device identification number of the known host device.

17. The method of claim 10, wherein obtaining the authentication data comprises receiving the authentication data indirectly from the host device through a wireless hardware key in communication with the host device according to a hardware key protocol.

18. The method of claim 10, further comprising communicating with one or more other wireless secure data storage devices to form a network, each wireless secure data storage device providing a node of the network for transferring portions of files of the data from the one or more data stores between the wireless secure data storage devices of the network.

* * * * *